US008904065B2

(12) United States Patent
Yoshimura

(10) Patent No.: US 8,904,065 B2
(45) Date of Patent: Dec. 2, 2014

(54) BUFFER MANAGEMENT DEVICE, BUFFER MANAGEMENT METHOD, AND STORAGE DEVICE

(75) Inventor: Noritsugu Yoshimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 171 days.

(21) Appl. No.: 13/285,347

(22) Filed: Oct. 31, 2011

(65) Prior Publication Data

US 2012/0239833 A1    Sep. 20, 2012

(30) Foreign Application Priority Data

Mar. 14, 2011    (JP) .................................. 2011-055669

(51) Int. Cl.
*G06F 3/00* (2006.01)
*G06F 3/06* (2006.01)
(52) U.S. Cl.
CPC ........................................ *G06F 3/06* (2013.01)
USPC .......................................................... 710/52
(58) Field of Classification Search
None
See application file for complete search history.

(56) References Cited

U.S. PATENT DOCUMENTS

| 7,363,400 | B2 | 4/2008 | Tanaka et al. | |
|---|---|---|---|---|
| 7,536,584 | B2 | 5/2009 | Davies et al. | |
| 8,045,472 | B2 * | 10/2011 | Wang et al. | 370/235 |
| 2008/0109589 | A1 * | 5/2008 | Honda | 711/103 |
| 2008/0313386 | A1 * | 12/2008 | Iwasaki | 711/101 |
| 2010/0165842 | A1 * | 7/2010 | Wang et al. | 370/235 |
| 2010/0287327 | A1 * | 11/2010 | Li et al. | 711/3 |
| 2011/0063978 | A1 * | 3/2011 | Hinosugi et al. | 370/235 |
| 2011/0064084 | A1 * | 3/2011 | Tatar et al. | 370/392 |
| 2011/0075555 | A1 * | 3/2011 | Ziegler | 370/229 |
| 2012/0045203 | A1 * | 2/2012 | Haramaty | 398/45 |

FOREIGN PATENT DOCUMENTS

| JP | 2005-267502 | 9/2005 |
|---|---|---|
| JP | 2009-540436 | 11/2009 |
| JP | 2011-003111 | 1/2011 |
| WO | WO-2007/146515 | 12/2007 |

OTHER PUBLICATIONS

Office Action for Japanese Patent Application No. 2011-055669, dated Apr. 30, 2013.

* cited by examiner

*Primary Examiner* — Henry Tsai
*Assistant Examiner* — Aurangzeb Hassan
(74) *Attorney, Agent, or Firm* — Patterson & Sheridan, LLP

(57) ABSTRACT

According to one embodiment, a buffer management device includes a buffer memory, a current-credit retaining module, a reserved-credit retaining module, a transfer controller, and a subtractor. The buffer memory manages a storage area in a credit unit representing a predetermined data size and temporarily stores data transferred from an external device. The current-credit retaining module retains the number of credits currently available for the buffer memory as a current credit value. The transfer controller registers the number of credits necessary to temporarily store the data in the reserved-credit retaining module as a reserved credit value prior to the transfer of the data from the external device to the buffer memory. The subtractor subtracts the reserved credit value registered in the reserved-credit retaining module from the current credit value retained by the current-credit retaining module and outputs a subtraction result as an available credit value.

18 Claims, 7 Drawing Sheets

US 8,904,065 B2

BUFFER MANAGEMENT DEVICE, BUFFER MANAGEMENT METHOD, AND STORAGE DEVICE

CROSS-REFERENCE TO RELATED APPLICATIONS

This application is based upon and claims the benefit of priority from Japanese Patent Application No. 2011-055669, filed Mar. 14, 2011, the entire contents of which are incorporated herein by reference.

FIELD

Embodiments described herein relate generally to a buffer management device, a buffer management method, and a storage device.

BACKGROUND

Storage devices with a built-in storage medium have a buffer memory to temporarily store data exchanged with a host computer. Such a storage device performs control such that write data is stored in the buffer memory (write buffer) in response to a write command from the host computer, and the write data is sequentially read from the write buffer and written to the storage medium.

Generally, a low-cost dynamic random access memory (DRAM) that provides a large-capacity area is used as the buffer memory. However, in recent years, a static random-access memory (SRAM) capable of faster processing is sometimes used to meet demand for high speed processing. Since the SRAM is more expensive than the DRAM, a large-capacity area is hardly available and there is risk of a buffer overflow. There have been proposed various technologies for preventing buffer overflows. For example, according to a known technology, if the available capacity of the buffer memory is a predetermined value or less, data is once stored in a memory area different from the buffer memory and then transferred to the buffer memory to prevent buffer overflows.

In serial attached small computer system interface (SAS), it is necessary to previously notify an initiator side of a receivable data size using an XFER_RDY (transfer ready) signal, and the data having the notified data size is transferred from the initiator side. In this case, the free space in the write buffer at the time the initiator side is notified may be different from that at the time the data is transferred from the initiator side. Therefore, to prevent buffer overflows, there is a need for a technology capable of correctly managing the free space in the write buffer. Conventional technologies take into account only the current free space, and cannot specify the free space at the time the data is transferred.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a buffer management device comprises a buffer memory, a current-credit retaining module, a reserved-credit retaining module, a transfer controller, and a subtractor. The buffer memory is configured to manage a storage area in a credit unit representing a predetermined data size and to temporarily store data transferred from an external device. The current-credit retaining module is configured to retain the number of credits currently available for the buffer memory as a current credit value. The transfer controller configured to register the number of credits necessary to temporarily store the data in the reserved-credit retaining module as a reserved credit value prior to the transfer of the data from the external device to the buffer memory. The subtractor is configured to subtract the reserved credit value registered in the reserved-credit retaining module from the current credit value retained by the current-credit retaining module and to output a subtraction result as an available credit value.

Figure 1:
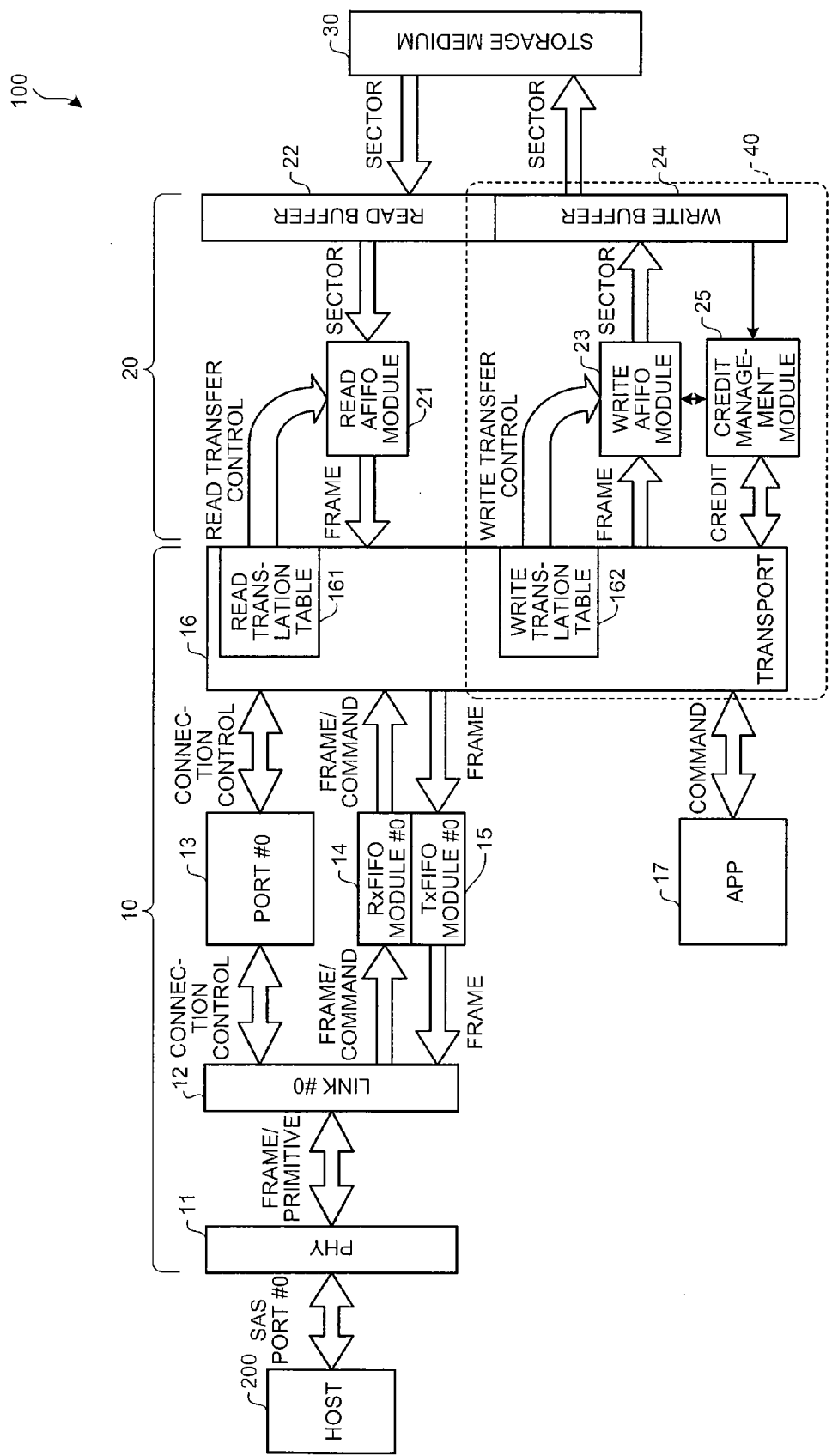
FIG. 1 is an exemplary schematic diagram of a configuration of a storage device according to an embodiment.

FIG. 1 schematically illustrates a configuration of a storage device 100 according to an embodiment. As illustrated in FIG. 1, the storage device 100 comprises a serial attached small computer system interface (SAS) module 10, a buffer management module 20, and a storage medium 30.

The SAS module 10 is an interface that connects the storage device 100 to a host 200, such as a computer, to be an initiator by using SAS. The SAS module 10 comprises a physical layer (PHY) 11, a link layer (LINK) 12, a port layer (PORT) 13, an RxFIFO module 14, a TxFIFO module 15, a transport layer (TRANSPORT) 16, and an application layer (APP) 17. FIG. 1 illustrates a configuration of a transfer port #0 for data transfer. If the storage device comprises a plurality of transfer ports, a set of the PHY 11, the LINK 12, the PORT 13, the RxFIFO module 14, the TxFIFO module 15, and the TRANSPORT 16 is provided for each of the transfer ports.

The PHY 11 is a functional module having the function of a physical layer. The PHY 11 converts an electric signal received from the host 200 into a signal in units of frame/primitive (frame/primitive signal) and outputs the frame/primitive signal to the LINK 12. The PHY 11 also converts a frame/primitive signal received from the LINK 12 into an electric signal and outputs the electric signal to the host 200.

The LINK 12 is a functional module having the function of a link layer. The LINK 12 converts the frame/primitive signal received from the PHY 11 into a signal in units of frame/command (frame/command signal) and outputs the frame/command signal to the RxFIFO module 14. The LINK 12 also outputs a connection control signal to control reading of the frame/command signal to the PORT 13. Upon receipt of a connection control signal from the PORT 13, the LINK 12 reads a signal in units of frames (frame signal) from the TxFIFO module 15 in response to the connection control signal, and the LINK 12 converts the frame signal into a frame/primitive signal and outputs the signal to the PHY 11.

The PORT 13 is a functional module having the function of a port layer. The PORT 13 transfers the connection control signal received from the LINK 12 to the TRANSPORT 16. The PORT 13 also transfers a connection control signal received from the TRANSPORT 16 to the LINK 12.

The RxFIFO module 14 retains data in units of frame/command output from the LINK 12. The TxFIFO module 15 also retains data in units of frames output from the TRANSPORT 16.

The TRANSPORT 16 is a functional module having the function of a transport layer. Upon receipt of the connection control signal from the PORT 13, the TRANSPORT 16 reads a frame/command signal from the RxFIFO module 14 in response to the connection control signal.

If a command specified by the frame/command signal is a read command to read data from the storage medium 30, the TRANSPORT 16 transmits a read transfer control signal to the buffer management module 20 (a read AFIFO module 21, described later) through a read translation table 161, thereby obtaining frame data read from the storage medium 30 from the buffer management module 20. The TRANSPORT 16 outputs a connection control signal to control reading of the frame data to the PORT 13 as well as outputting the frame data to the RxFIFO module 14. The read translation table 161 is a functional module that informs the buffer management module 20 of a storage address of the data read by the read command.

If the command specified by the frame/command signal is a write command to write data to the storage medium 30, the TRANSPORT 16 transmits a write transfer control signal to the buffer management module 20 (a write AFIFO module 23, described later) through a write translation table 162, and outputs the data to be written to the buffer management module 20 (a write AFIFO module 23, described later) to store the data in the storage medium 30. The write translation table 162 is a functional module that informs the buffer management module 20 of a sector count, a buffer address, a logical block addressing (LBA) of the data to be written by the write command. The detailed configuration related to data writing will be described later.

The APP 17 is a functional module having the function of an application layer. The APP 17 exchanges various commands with the TRANSPORT 16. Each of the PHY 11, the LINK 12, the PORT 13, the TRANSPORT 16, and the APP 17 may be implemented using a dedicated chip corresponding to each layer, or the PHY 11, the LINK 12, the PORT 13, the TRANSPORT 16, and the APP 17 may be implemented using a chip that integrates the functions of some of or all the layers.

The buffer management module 20 will be described below. The buffer management module 20 manages buffers that are used in reading and writing data. The buffer management module 20 comprises the read AFIFO module 21, a read buffer 22, the write AFIFO module 23, a write buffer 24, and a credit management module 25. If the storage device comprises a plurality of transfer ports for data transfer, the read AFIFO module 21 and the write AFIFO module 23 are provided for each of the transfer ports with the corresponding TRANSPORT 16.

The read AFIFO module 21 is an intermediate buffer for read operation. The read AFIFO module 21 reads data in units of sectors from the read buffer 22 in response to a read transfer control signal received from the TRANSPORT 16. The read AFIFO module 21 then converts the sector data into frame data and outputs the frame data to the TRANSPORT 16. The read buffer 22 is a semiconductor memory, such as a static random-access memory (SRAM) and a double data rate synchronous dynamic random access memory (DDR SDRAM), to temporarily store sector data read from the storage medium 30.

The write AFIFO module 23 is an intermediate buffer for write operation. In response to a write transfer control signal received from the TRANSPORT 16, the write AFIFO module 23 converts frame data to be written transferred from the TRANSPORT 16 into sector data and stores the sector data in the write buffer 24.

The write buffer 24 is a semiconductor memory, such as SRAM and DDRSDRAM, to temporarily store data to be written and to write the data to the storage medium 30 at a predetermined time. In the write buffer 24, an area in which the data is temporarily stored is managed in units of credits representing a predetermined data size. Although there is no particular limitation to the data size represented by one credit, preferably, the data size is determined based on the storage unit of the storage medium 30. For example, preferably, the data size of one sector is set to one credit if the storage medium 30 stores data in units of sectors, while the data size of one page is set to one credit if the storage medium 30 stores data in units of pages including a plurality of sectors. In the embodiment, an example is described in which one credit represents a page comprising a power-of-two sectors (for example, 8 sectors).

The credit management module 25 manages the number of credits (current credit value, described later) that are currently available for the write buffer 24 based on data input/output state in the write AFIFO module 23 and the write buffer 24. The credit management module 25 ensures the number of credits (reserved credit value, described later) necessary to temporarily store data to be written prior to the transfer of the data. The credit management module 25 notifies the TRANSPORT 16 of a result obtained by subtracting the reserved credit value from the current credit value as an available credit value.

The TRANSPORT 16 determines the data size of data to be transferred from the host 200 based on the notification of the available credit value from the credit management module 25, and makes transition to the data transfer phase by notifying the host 200 of the data size using a XFER_RDY (transfer ready) signal. In this manner, a write buffer management module 40 that manages the write buffer 24 is implemented by the collaboration of the TRANSPORT 16, the write AFIFO module 23, and the credit management module 25 (see a broken-line part of FIG. 1).

Figure 2:
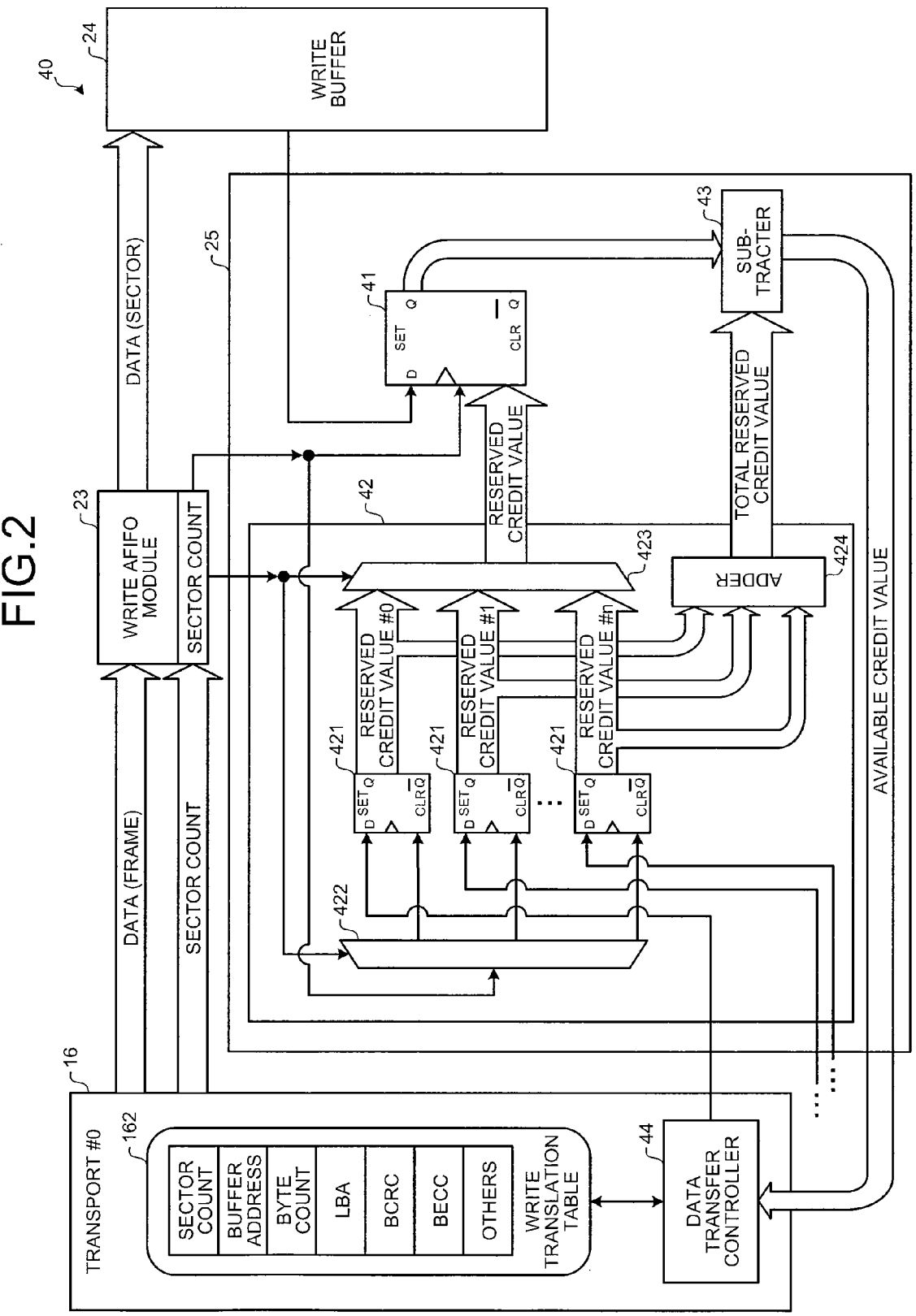
FIG. 2 is an exemplary schematic diagram of a configuration of a write buffer management module in the embodiment.

A configuration of the write buffer management module 40 will be described with reference to FIG. 2. FIG. 2 is schematically illustrates the configuration of the write buffer management module 40.

The write buffer management module 40 comprises a data transfer controller 44 in addition to the write translation table 162, the write AFIFO module 23, the write buffer 24, and the credit management module 25. The data transfer controller 44 is a functional module that is provided in the TRANSPORT 16 of each transfer port.

The write translation table 162 sets and retains a sector count, a buffer address, a byte count, an LBA, a cyclic redundancy check (CRC) code in the storage medium 30 (BCRC), error checking and correcting (ECC) in the storage medium 30 (BECC), and the like of data to be written in response to a write command output from the host 200, and outputs them as a write transfer control signal to the write AFIFO module 23. The sector count corresponds to the total number of pieces of data output to the write AFIFO module 23, i.e., a credit value, which will be described later. As described later, the sector count is determined in collaboration with the data transfer controller 44.

As described above, the write AFIFO module 23 converts frame data received from the TRANSPORT 16 into sector data and outputs the converted sector data to the write buffer 24 based on a write transfer control signal. Having started outputting the sector data to the write buffer 24, the write AFIFO module 23 notifies selectors 422 and 423 of the credit management module 25 of the start of the output of the sector data. Upon completion of outputting data corresponding to the number of sector counts (reserved credit value) notified by the TRANSPORT 16, the write AFIFO module 23 notifies a current-credit resister 41 and the selectors 422 and 423 of the credit management module 25 of the completion of the data output.

The write buffer 24 temporarily stores data received from the write AFIFO module 23. Each time outputting data of one credit to the storage medium 30, the write buffer 24 notifies the current-credit register 41 of the event.

As illustrated in FIG. 2, the credit management module 25 comprises the current-credit register 41, a reserved credit value management module 42, a subtractor 43, and the data transfer controller 44 as functional modules.

The current-credit register 41 is a functional module that retains the number of credits currently available for the write buffer 24 as a current credit value. Specifically, in response to a notification of the output of data corresponding to the number of reserved credit values from the write AFIFO module 23, the current-credit register 41 subtracts, from the current credit value, a reserved credit value corresponding to the notification from the write AFIFO module 23, which is received from the reserved credit value management module 42. The current-credit register 41 increments the current credit value by 1 each time the current-credit register 41 is notified of the output of one-credit data by the write buffer 24.

In this manner, the current-credit register 41 updates the current credit value in real time in response to data output from the write AFIFO module 23 (data input to the write buffer 24) and data output from the write buffer 24. This configuration enables hardware to manage the current credit value, and thus the high-speed processing can be achieved. It is assumed herein that the current-credit register 41 retains the total credit value of the write buffer 24 in the initial state where data write is not performed yet.

The reserved credit value management module 42 is a functional module that receives the number of credits corresponding to the data size of data to be transferred (transmitted) from the host 200 from the data transfer controller 44 before the data is transferred from the host 200 and manages the number of credits as a reserved credit value. Specifically, the reserved credit value management module 42 comprises one or a plurality of reserved-credit registers 421, selectors 422 and 423, and an adder 424 as functional modules.

The reserved-credit registers 421 each retain the reserved credit value of data that is transferred using a write command. FIG. 2 illustrates an example in which the n (n: a positive integer) reserved-credit registers 421 are provided.

In response to a notification of data output start received from the write AFIFO module 23 of one of the transfer ports, the selector 422 and the selector 423 select one of the reserved-credit registers 421 that retains the reserved credit value of a transfer (output) target corresponding to a write command, and output the reserved credit value to the current-credit register 41. The selector 422 clears the reserved-credit register 421 corresponding to a write command, for which data transfer (output) is completed, in response to a notification of data output completion received from the write AFIFO module 23 of one of the transfer ports.

The adder 424 adds reserved credit values retained by the reserved-credit registers 421 and outputs the sum to the subtractor 43.

The subtractor 43 subtracts the total number of reserved credit values managed by the reserved credit value management module 42, i.e., the sum obtained by the adder 424, from the current credit value retained by the current-credit register 41. The subtractor 43 outputs the difference as a available credit value to the data transfer controller 44 for each transfer port. The available credit value is a value obtained by subtracting the data size (reserved credit value) of data to be transferred from the number of currently-available credits (current credit value) of the write buffer 24. That is, the write buffer 24 is used within the range of the available credit value, which prevents overflow of the write buffer 24.

The data transfer controller 44 is a functional module that determines the data size of data to be transferred from the host 200 based on the notification of an available credit value from the credit management module 25 (the subtractor 43).

Figure 3:
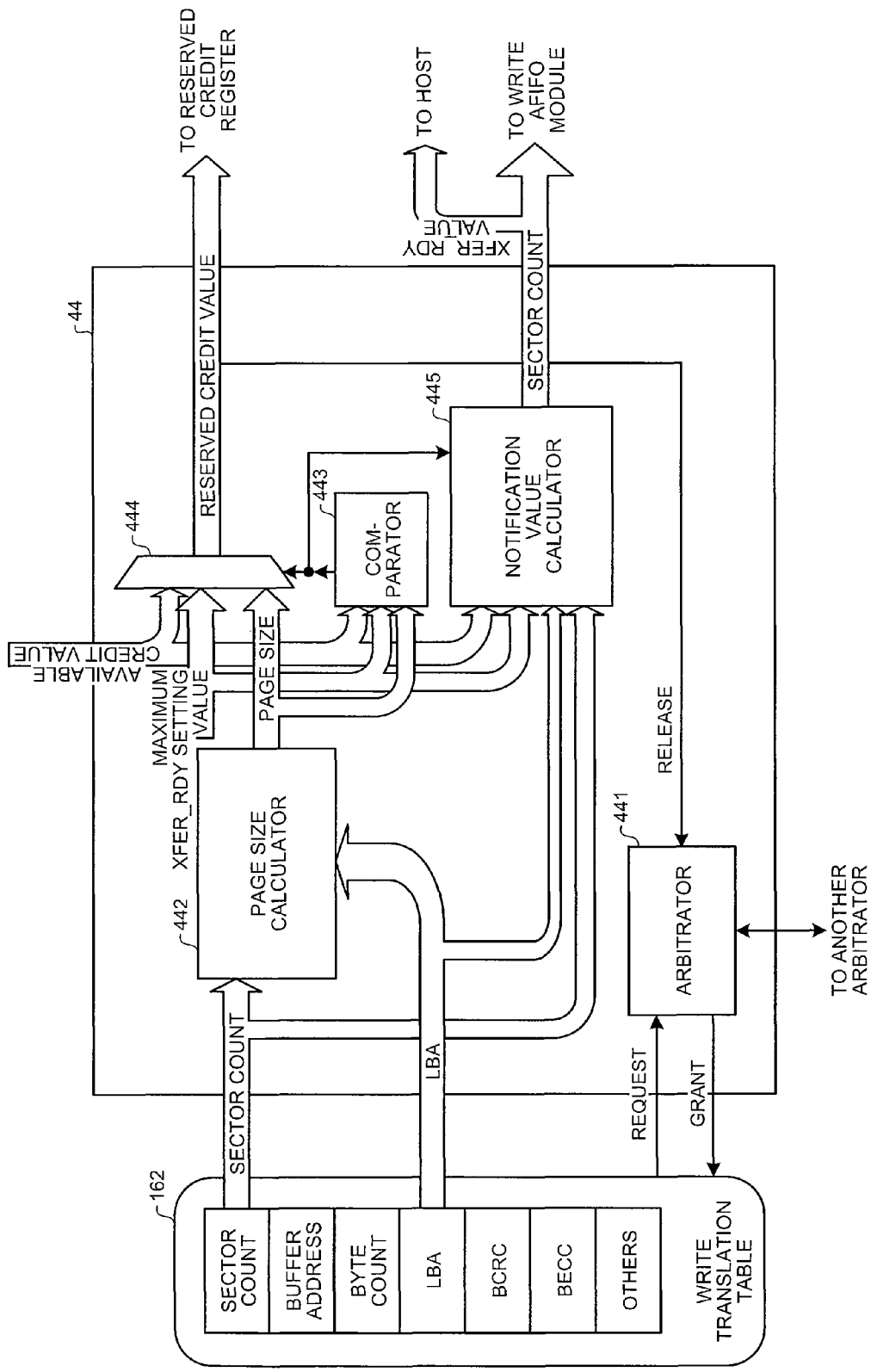
FIG. 3 is an exemplary schematic diagram of a configuration of a data transfer controller in the embodiment.

FIG. 3 schematically illustrates a configuration of the data transfer controller 44. As illustrated in FIG. 3, the data transfer controller 44 comprises an arbitrator 441, a page size calculator 442, a comparator 443, a selector 444, and a notification value calculator 445.

In order to prevent competitive access to an available credit value output from the subtractor 43, the arbitrator 441 arbitrates requests to use the available credit value with the TRANSPORT 16 (the arbitrator 441) of another transfer port and provides permission to use the available credit value to one arbitrator 441. Specifically, when the transfer function of the write translation table 162 is activated by a write command, the arbitrator 441 makes a request for the right to use the credit management module 25 to the other arbitrator 441. If the arbitrator 441 is granted the use right from the other arbitrator 441, the state is achieved where the one arbitrator 441 can use the available credit value. The arbitrator 441 releases the use right according to the output of a reserved credit value from the selector 444.

When the arbitrator 441 is granted the use right, the page size calculator 442 calculates the page size of data partitioned into pages based on a sector count and an LBA retained by the write translation table 162 upon receiving the write command. Specifically, if one page is constituted of power-of-two sectors, the page size calculator 442 calculates the page size of to-be-written data partitioned into pages based on the following Equation (1):

$$\text{page size} = (LBA[(n-1):0] \neq 0) + \\ (\text{sector count} - (2^n - LBA[(n-1):0]))/2^n + \\ ((\text{sector count} - (2^n - LBA[(n-1):0]))[(n-1)] \neq 0) \quad (1)$$

where "n" is an integer 1 or more.

The comparator 443 compares the available credit value notified by the subtractor 43, a maximum XFER_RDY setting value representing the maximum page size upon writing predetermined data, and the page size calculated by the page size calculator 442 to select a value indicating the minimum data size. It is assumed herein that the maximum XFER_RDY setting value is stored in advance in a recording medium (not illustrated).

The selector 444 outputs the value selected by the comparator 443 as a reserved credit value to the reserved-credit register 421 for the transfer port thereof, thereby registering the reserved credit value.

The notification value calculator 445 derives the sector count (hereinafter referred to as a notification sector count) giving notice to the host 200 and the write AFIFO module 23 based on the sector count and the LBA of the data of the write target and the selection result of the comparator 443, which are retained by the write translation table 162. Specifically, in the case where the comparator 443 selects the available credit value, the notification value calculator 445 calculates the notification sector count using the following Equation (2):

$$\text{notification sector count} = \text{available credit value} * 2^n - \text{LBA}[(n-1):0] \qquad (2)$$

where it is assumed that one page is constituted of power-of-two sectors.

When the maximum XFER_RDY setting value is selected, the notification value calculator 445 sets a value obtained by multiplying the maximum XFER_RDY setting value by the number of sectors constituting one page to the notification sector count. When the page size calculated by the page size calculator 442 is selected, the notification value calculator 445 sets a value obtained by multiplying the page size by the number of sectors constituting one page to the notification sector count.

The notification value calculator 445 notifies the host 200 of the derived notification sector count as an XFER_RDY (transfer ready) signal through the SAS module 10. The notification value calculator 445 also notifies the write AFIFO module 23 of the derived notification sector count. With this, in response to the XFER_RDY signal, the host 200 starts transferring pieces of data corresponding to the notification sector count notified by the XFER_RDY signal. The write translation table 162 outputs a write transfer control signal to the write AFIFO module 23 according to the transferred data to start data output to the write AFIFO module 23.

In this manner, the data transfer controller 44 selects a value having the minimum data size from the available credit value, the maximum XFER_RDY setting value, and the page size calculated by the page size calculator 442. The data transfer controller 44 registers the minimum data size as a reserved credit value in the reserved-credit register 421, and causes the host 200 to transmit data of the minimum data size. This reliably prevents buffer overflows in the write buffer 24.

Figure 4:
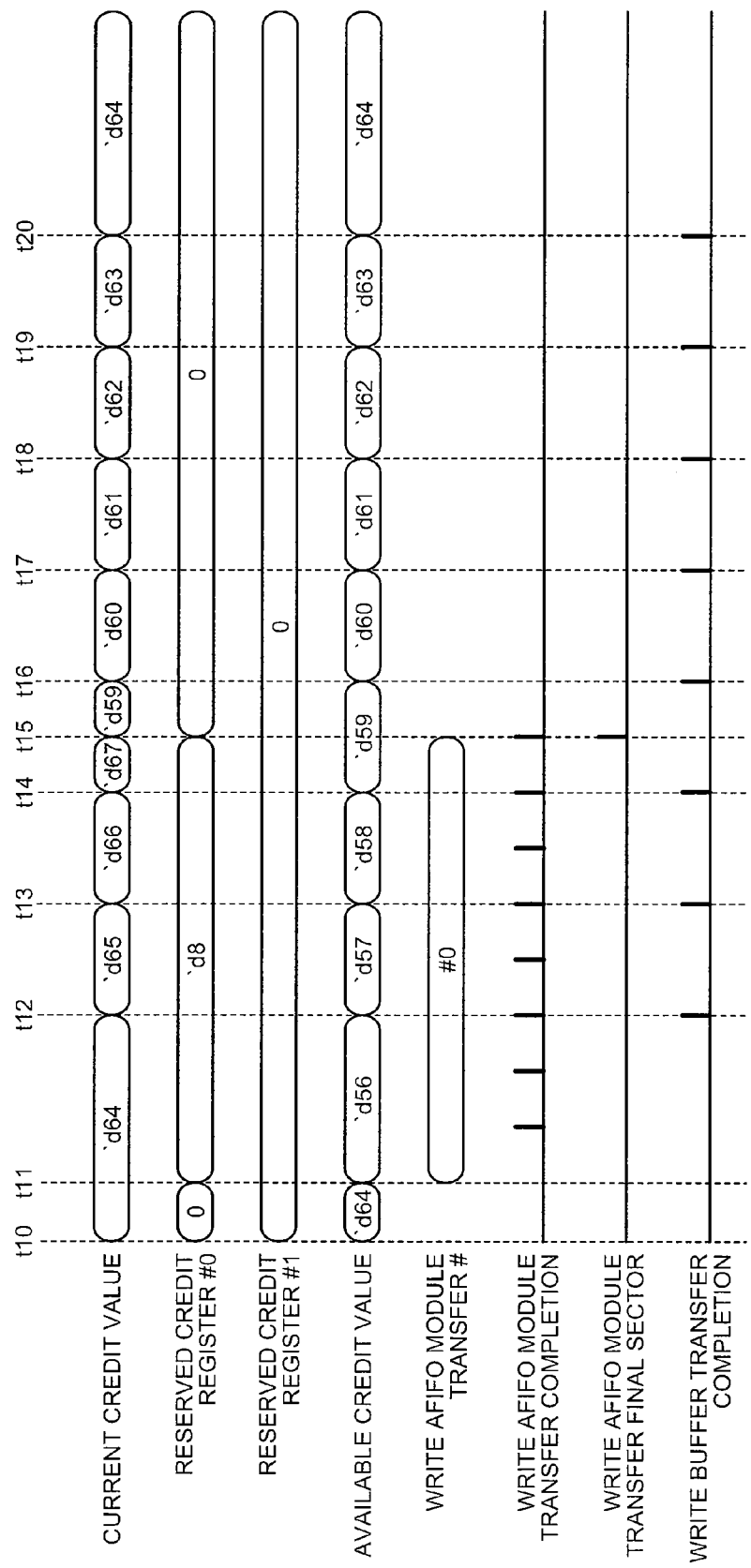
FIG. 4 is an exemplary diagram illustrating a control sequence of the write buffer management module in the embodiment.

The operation of the write buffer management module 40 will be described below with reference to FIGS. 2, 4, and 5. FIG. 4 illustrates an example of a control sequence of the write buffer management module 40. FIG. 4 illustrates an example in which data is transferred from a single transfer port (transfer port #0).

At time t10, it is assumed that "d64" is the current credit value retained by the current-credit register 41, while "0" is the reserved credit value stored in each of the reserved-credit registers 421. At this point, the available credit value output from the subtractor 43 is identical to the current credit value, i.e., "d64".

At time t11, when the reserved credit value "d8" is registered in the reserved-credit register 421 from the data transfer controller 44 of the transfer port #0 to start data transfer to the write AFIFO module 23 of the transfer port #0, the available credit value output from the subtractor 43 becomes "d56" in which "d8" is subtracted from "d64".

Subsequently, sector data are sequentially transferred to the write buffer 24 from the write AFIFO module 23 of the transfer port #0. At time t12, the write buffer 24 outputs data of one credit to the storage medium 30. The current-credit register 41 increments the current credit value by 1 to "d65" according to the output of the data of one credit to the storage medium 30. At this point, the available credit value output from the subtractor 43 becomes "d57" in which "d8" is subtracted from "d65".

At time t13, when the write buffer 24 outputs the data of one credit to the storage medium 30, the current-credit register 41 sets the current credit value to "d66" according to the output of the data of one credit to the storage medium 30, whereby the available credit value output from the subtractor 43 becomes "d58". At time t14, when the write buffer 24 outputs the data of one credit to the storage medium 30, the current-credit register 41 sets the current credit value to "d67" according to the output of the data of one credit to the storage medium 30, whereby the available credit value output from the subtractor 43 becomes "d59".

At time t15, upon completion of data transfer to the write buffer 24 from the write AFIFO module 23 of the transfer port #0, the current-credit register 41 subtracts the reserved credit value "d8", which is retained by the reserved-credit register 421 used in the data transfer of the transfer port #0, from the current credit value "d67" to set the current credit value to "d59". The selector 422 clears the reserved-credit register 421 corresponding to the transfer port #0 in response to the completion of the output of the data to the write buffer 24. At this point, the available credit value output from the subtractor 43 becomes "d59", and thus the previous value is maintained.

At times t16 to t19, when pieces of data of three credits are sequentially output from the write buffer 24 to the storage medium 30, the current credit value and the available credit value are sequentially increased from "d60" to "d63" by the same control as described above. At time t20, upon completion of data output from the write buffer 24, the current-credit register 41 sets the current credit value to "d64" in response to this, whereby the available credit value output from the subtractor 43 becomes "d64".

Figure 5:
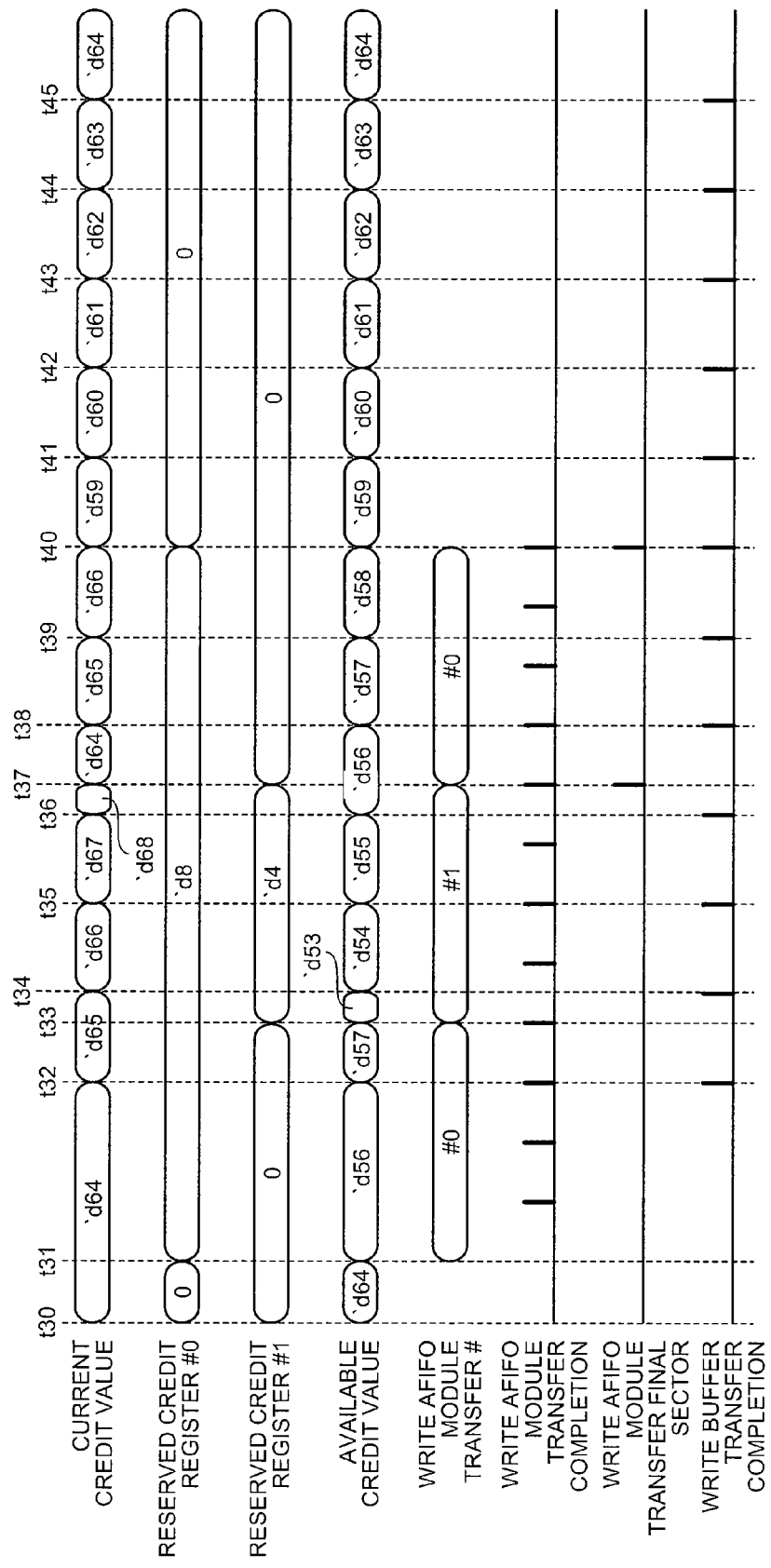
FIG. 5 is an exemplary diagram illustrating another control sequence of the write buffer management module in the embodiment.

FIG. 5 illustrates another example of a control sequence of the write buffer management module 40. FIG. 5 illustrates an example in which data is transferred from a plurality of transfer ports (transfer ports #0 and #1).

At time t30, it is assumed that "d64" is the current credit value retained by the current-credit register 41, while "0" is the reserved credit value stored in each of the reserved-credit registers 421. At this point, the available credit value output from the subtractor 43 is identical to the current credit value, i.e., "d64".

At time t31, when the reserved credit value "d8" is registered in the reserved-credit register 421 from the data transfer controller 44 of the transfer port #0 to start data transfer to the write AFIFO module 23 of the transfer port #0, the available credit value output from the subtractor 43 becomes "d56" in which "d8" is subtracted from "d64".

Subsequently, sector data are sequentially output to the write buffer 24 from the write AFIFO module 23 of the transfer port #0. At time t32, the write buffer 24 outputs data of one credit to the storage medium 30. The current-credit register 41 increments the current credit value by 1 to "d65" according to the output of the data of one credit to the storage medium 30. At this point, the available credit value output from the subtractor 43 becomes "d57" in which "d8" is subtracted from "d65".

At time t33, when the reserved credit value "d4" is registered in the reserved-credit register 421 from the data transfer controller 44 of the transfer port #1 to start data transfer to the write AFIFO module 23 of the transfer port #1, the available credit value output from the subtractor 43 becomes "'d53'" in which "'d4'" is subtracted from "'d57'".

At times t34 to t36, when pieces of data of three credits are sequentially output from the write buffer 24 to the storage medium 30, the current credit value is sequentially increased from "'d66'" to "'d68'" by the same control as described above, and the available credit value is sequentially increased from "'d54'" to "'d56'" according to the increase of the current credit value.

At time t37, upon completion of data transfer to the write buffer 24 from the write AFIFO module 23 of the transfer port #1, the current-credit register 41 subtracts the reserved credit value "'d4'", which is retained by the reserved-credit register 421 used in the data transfer of the transfer port #1, from the current credit value "'d68'" to set the current credit value to "'d64'". The selector 422 clears the reserved-credit register 421 corresponding to the transfer port #1 in response to the completion of the data transfer to the write buffer 24. At this point, the available credit value output from the subtractor 43 becomes "'d56'" in which the reserved credit value "'d8'" of the transfer port #0 is subtracted from the current credit value "'d64'", and thus the previous value is maintained.

At times t38 and t39, when pieces of data of two credits are sequentially output from the write buffer 24 to the storage medium 30, the current credit value is increased from "'d65'" to "'d66'" by the same control as described above, and the available credit value is increased from "'d57'" to "'d58'" according to the increase of the current credit value.

At time t40, upon completion of data output to the write buffer 24 from the write AFIFO module 23 of the transfer port #0, the current-credit register 41 subtracts the reserved credit value "'d8'", which is retained by the reserved-credit register 421 used in the data transfer of the transfer port #0, from the current credit value "'d66'" to set the current credit value to "'d58'". The selector 422 clears the reserved-credit register 421 corresponding to the transfer port #0 in which the data output is performed in response to the completion of the data output to the write buffer 24. When the write buffer 24 outputs data of one credit to the storage medium 30 at time t40, the current-credit register 41 increments the current credit value by 1 to "'d59'". At this point, the available credit value output from the subtractor 43 becomes "'d59'".

At times t41 to t44, when pieces of data of four credits are sequentially output from the write buffer 24 to the storage medium 30, the current credit value is sequentially increased from "'d60'" to "'d63'" by the same control as described above, and the available credit value is sequentially increased from "'d60'" to "'d63'" according to the increase of the current credit value. At time t45, upon completion of data output from the write buffer 24, the current-credit register 41 sets the current credit value to "'d64'" in response to the completion of the data output from the write buffer 24, whereby the available credit value output from the subtractor 43 becomes "'d64'".

In this manner, the write buffer management module 40 dynamically updates the available credit value of the write buffer 24. Thus, the data transfer controller 44 can control the amount of data write while understanding the available credit value in real time.

Figure 6:
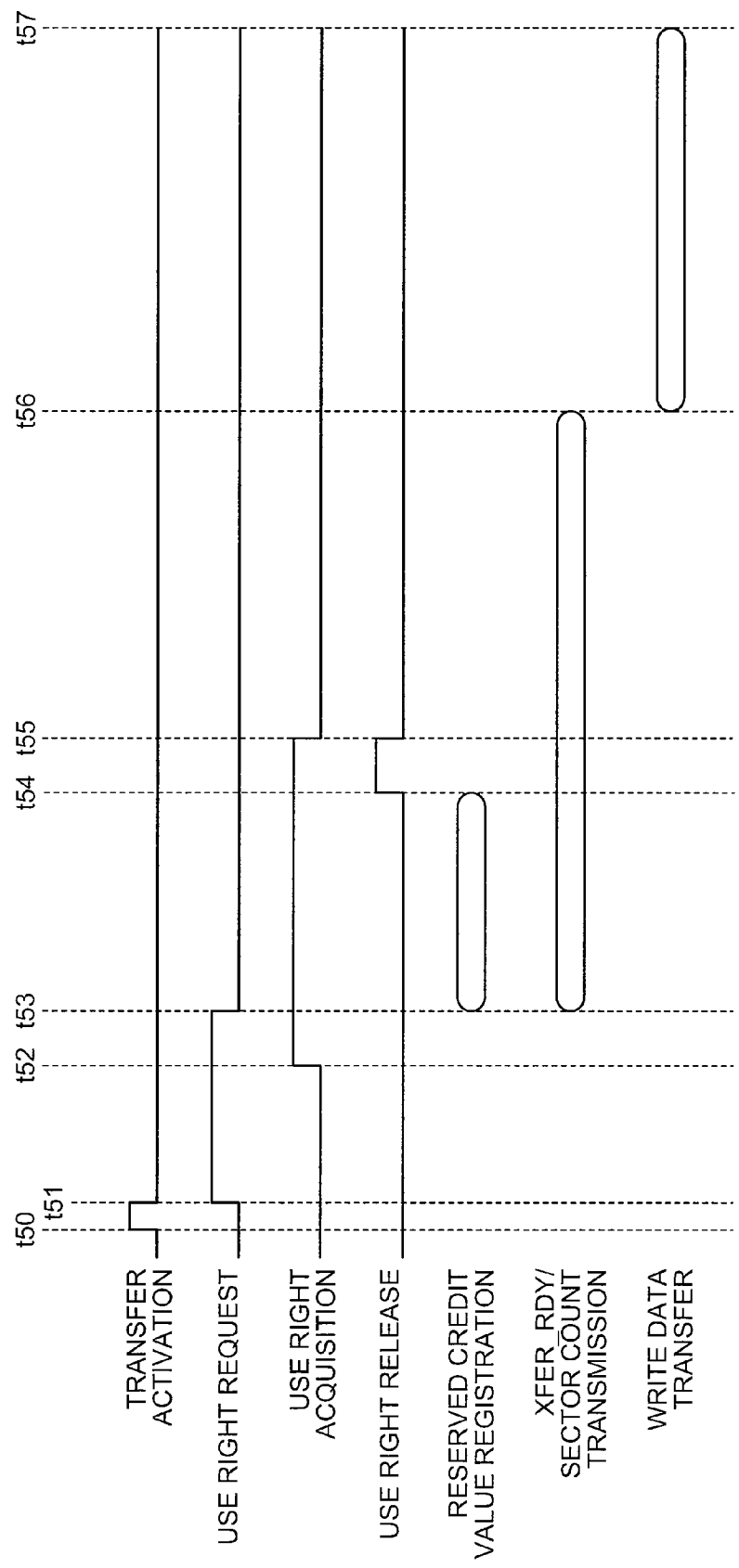
FIG. 6 is an exemplary diagram illustrating a control sequence of the data transfer controller in the embodiment.

The operation of the data transfer controller 44 will be described below with reference to FIGS. 3 and 6. FIG. 6 illustrates an example of a control sequence of the data transfer controller 44.

At time t51, when the transfer function of the write translation table 162 of one of the transfer ports is activated by a write command, the arbitrator 441 starts making a request for use right. When the use right is granted to the arbitrator 441 at time t52, the data transfer controller 44 determines (selects) a reserved credit value using the functions of the page size calculator 442, the comparator 443, and the selector 444 at times t53 and t54, and registers the reserved credit value in the reserved-credit register 421 in which another reserved credit value is not registered yet. At times t54 and t55, the arbitrator 441 releases the use right to turn over the use right to another arbitrator 441 according to the registration of the reserved credit value.

On the other hand, at times t53 to t55, upon deriving a notification sector count based on the reserved credit value selected by the comparator 443, the notification value calculator 445 notifies the write AFIFO module 23 corresponding to the transfer port thereof as well as the host 200 of the notification sector count as an XFER_RDY signal. At times t56 and t57, in response to the notification of the XFER_RDY signal to the host 200, data to be written having a data size (sector count) notified by the XFER_RDY signal is transferred from the host 200 and output to the write AFIFO module 23.

In this manner, in the data transfer controller 44, a reserved credit value is registered in the reserved-credit register 421 prior to the transfer of write data, and the host 200 is notified by an XFER_RDY signal to transmit data in a size corresponding to the reserved credit value. Thus, data corresponding to the reserved credit value is transferred from the host 200.

As described above, according to the embodiment, a current credit value indicating the number of credits currently available in the write buffer 24 and a reserved credit value indicating the number of credits necessary to temporarily store data to be transferred from the host 200 are managed to output an available credit value obtained by subtracting the reserved credit value from the current credit value. With this, the free space at the time point the data is transferred from the host 200, i.e., the available credit value, can be specified. Thus, the free space of the write buffer 24 can be managed more accurately.

The data transfer controller 44 determines the data size of data to be transferred from the host 200 based on the available credit value output from the subtractor 43 of the credit management module 25. The data transfer controller 44 notifies the host 200 of an XFER_RDY signal to inform that data having the data size can be received, and registers the reserved credit value necessary to temporarily store the data in the reserved-credit register 421. The data size of the newly-transferred data and the reserved credit value thereof can be determined based on the available credit value. Accordingly, the free space of the write buffer at the time point the host 200 is notified and the free space of the write buffer at the time point the data is transferred from the host 200 can be set to the same value to prevent buffer overflows. In the embodiment, the data transfer controller 44 is provided with respect to each transfer channel, and the competition during data transfer can be prevented by the arbitrator 441 of the data transfer controller 44. Thus, a plurality of write commands can be executed at the same time.

The embodiment is susceptible to various modifications and alternative forms. For example, in the embodiment, the write buffer management module 40 clears the reserved credit value registered in the reserved-credit register 421 at the time point the write AFIFO module 23 outputs data of the notified sector count to the write buffer 24. Alternatively, the corresponding reserved credit value may be decremented by 1 every time the write AFIFO module 23 outputs data of one credit. This mode will be described below with reference to FIG. 7.

Figure 7:
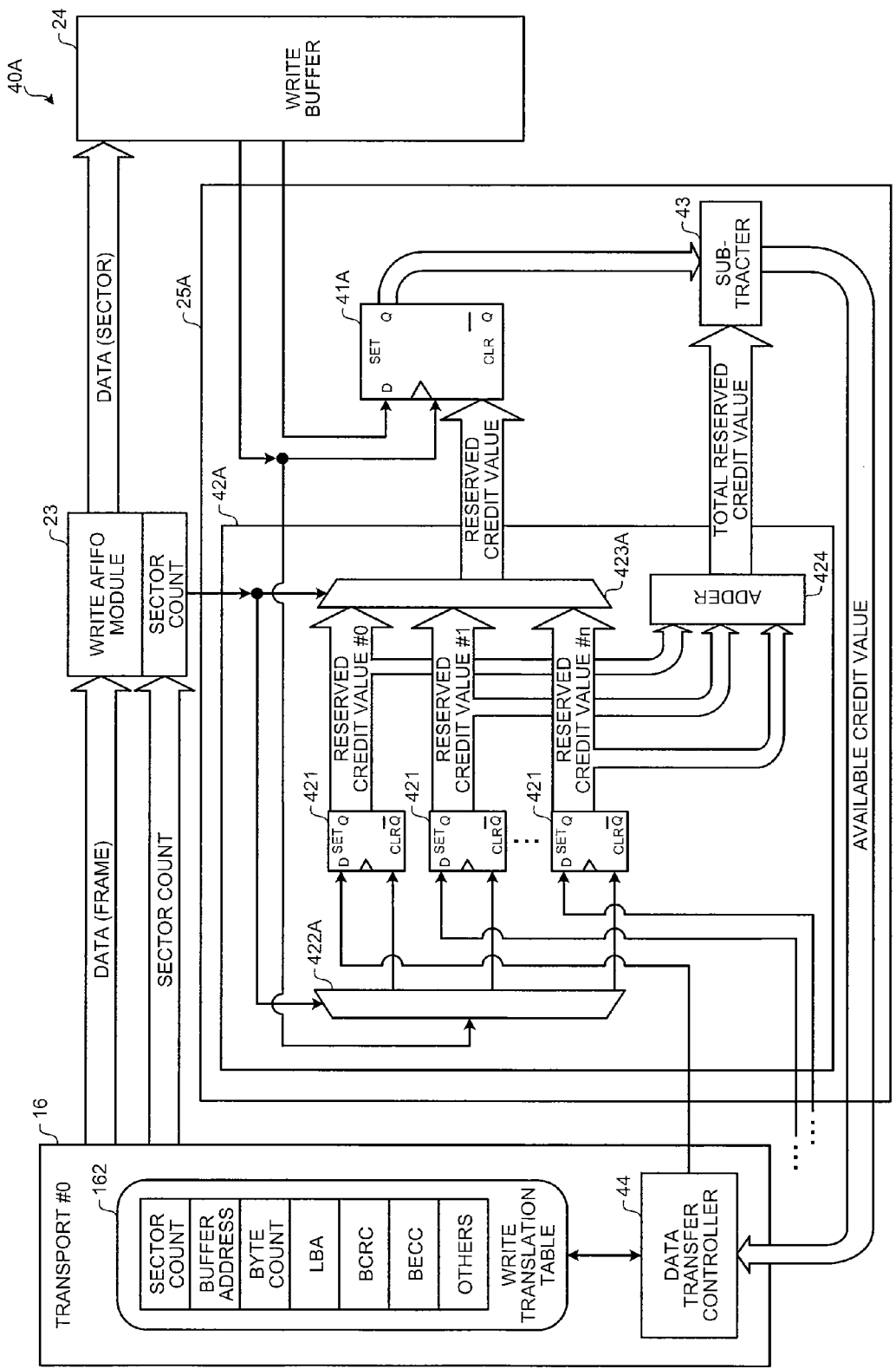
FIG. 7 is an exemplary schematic diagram of a configuration of a write buffer management module according to a modification of the embodiment.

FIG. 7 schematically illustrates a configuration of a write buffer management module 40A according to a modification of the embodiment. Elements corresponding to those of the embodiment are designated by the same reference numerals, and their description will not be repeated.

As illustrated in FIG. 7, the write buffer management module 40A comprises a credit management module 25A, and the credit management module 25A comprises a current-credit register 41A, a reserved credit value management module 42A, and the subtractor 43 as functional modules. The write buffer management module 40A differs from the write buffer management module 40 in that, every time data of one credit is received from the write AFIFO module 23, the write buffer 24 notifies the current-credit register 41A and the reserved credit value management module 42A that the data of one credit is received from the write AFIFO module 23.

The current-credit register 41A differs from the current-credit register 41 in that the current credit value is decremented by 1 every time the current-credit register 41A is notified that data of one credit is received from the write buffer 24.

The reserved credit value management module 42A comprises one or a plurality of reserved-credit registers 421, a selector 422A, a selector 423A, and the adder 424 as function modules. The selector 422A and the selector 423A differ from the selector 422 and the selector 423 in that, every time the write buffer 24 notifies the selector 422A and the selector 423A that data of one credit is received, the selector 422A decrements the reserved credit value by 1 in the reserved-credit register 421 corresponding to the transfer port of the write AFIFO module 23 that outputs the data, and the selector 423A outputs the decremented reserved credit value to the current-credit register 41A.

This configuration of the write buffer management module 40A can update the reserved credit value in real time. The available credit value notified by the subtractor 43 is similar to that of the write buffer management module 40. Thus, the same effect as described in the embodiment can be achieved.

While, in the embodiment, the number of sectors constituting one page is set to a power of two, it may be set to any other value. In the case where the number of sectors constituting one page is set to a value except a power of two, the page size calculator 442 calculates the page size using the following Equation (3):

$$\text{page size}=(\text{LBA mod } m\neq 0)+(\text{sector count}-(m-(\text{LBA mod } m)))/m+(((\text{sector count}-(m-(\text{LBA mod } m))) \text{ mod } m)\neq 0) \quad (3)$$

where "m" is an integer 1 or more except a power of two.

In the case where the maximum XFER_RDY setting value is determined on power-of-two basis, "sector count" of the Equation (3) is set to the maximum XFER_RDY setting value to convert the maximum XFER_RDY setting value into the page size except a power of two.

When the comparator 443 selects an available credit value, the notification sector count is derived using the following Equation (4):

$$\text{notification sector count}=\text{available credit value}*m-(\text{LBA mod } m) \quad (4)$$

With this, it is possible to deal with the storage medium 30 in which one page is constituted of the number of sectors except a power of two. Thus, the versatility of the write buffer management module 40 can be improved.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A buffer management device comprising:
a buffer memory configured to manage a storage area according to a credit unit having a predetermined data size and to temporarily store write data requested to be written by a write command from an external device;
a current-credit storing module configured to store a number of credits currently available for the buffer memory as a current credit value;
a reserved-credit storing module;
a transfer controller configured to register a number of credits necessary to temporarily store the write data in the reserved-credit storing module as a reserved credit value prior to transfer of the write data from the external device to the buffer memory; and
a subtractor configured to subtract the reserved credit value registered in the reserved-credit storing module from the current credit value stored by the current-credit storing module and to output a subtraction result as an available credit value, wherein
the transfer controller includes a converter configured to convert the write data into one or more credit units and at least one of a remainder for a beginning region of the write data and a remainder for an ending region of the write data, the remainders being determined based on a logical address of the write data, and each remainder having a data size that is less than the predetermined data size of the credit unit, and wherein the reserved credit value registered by the transfer controller is a sum of one credit for each of the credit units and one credit for each of the remainders.

2. The buffer management device of claim 1, wherein the current-credit storing module is configured to subtract the reserved credit value from the current credit value every time the write data corresponding to the reserved credit value is transferred to the buffer memory and to increment the current credit value by one every time write data of the credit unit is output from the buffer memory, and
the reserved-credit storing module is configured to clear the reserved credit value in response to the transfer of the write data corresponding to the reserved credit value to the buffer memory.

3. The buffer management device of claim 2, further comprising an intermediate buffer configured to convert the data transferred from the external device into the credit unit and to transfer the write data to the buffer memory, wherein
the current-credit storing module is configured to subtract the reserved credit value from the current credit value in response to completion of the transfer of the write data corresponding to the reserved credit value by the intermediate buffer, and
the reserved-credit storing module is configured to clear the reserved credit value in response to the completion of the transfer of the write data corresponding to the reserved credit value by the intermediate buffer.

4. The buffer management device of claim 2, wherein the current-credit storing module is configured to decrement the current credit value by one every time write data of the credit unit is transferred to the buffer memory.

5. The buffer management device of claim 1, wherein the transfer controller is configured to determine a data size of the write data to be transferred by the external device and the reserved credit value corresponding to the write data size based on the available credit value output from the subtractor.

6. The buffer management device of claim 5, wherein the transfer controller further comprises:
a selector configured to compare the data size converted by the converter, the available credit value, and a predetermined maximum number of receivable credits, and to select a smallest value as the reserved credit value; and
a notification module configured to notify the external device of a transfer ready signal indicating the data size corresponding to the reserved credit value selected by the selector.

7. The buffer management device of claim 1, wherein the transfer controller comprises a plurality of transfer controllers,
the reserved-credit storing module comprises a plurality of reserved-credit storing modules,
the transfer controller comprises an arbitrator configured to arbitrate a request to use the available credit value with other transfer controllers and to provide permission to use the available credit value to one of the other transfer controllers, and
the subtractor is configured to subtract a sum of reserved credit values stored by the reserved-credit storing modules from the current credit value stored by the current-credit storing module and to output a subtraction result as the available credit value.

8. The buffer management device of claim 1, wherein the write data is initially allocated in units of sectors, the credit unit is allocated in units of pages, and a page comprises a plurality of sectors.

9. A storage device comprising:
a connector configured to be connectable to a host device;
a buffer memory configured to manage a storage area according to a credit unit having a predetermined data size and to temporarily store write data requested to be written by a write command from the host device;
a storage medium where the write data temporarily stored in the buffer memory is to be written;
a current-credit storing module configured to store a number of credits currently available for the buffer memory as a current credit value;
a reserved-credit storing module;
a transfer controller configured to register a number of credits necessary to temporarily store the write data in the reserved-credit storing module as a reserved credit value prior to transfer of the write data from the host device to the buffer memory; and
a subtractor configured to subtract the reserved credit value registered in the reserved-credit storing module from the current credit value stored by the current-credit storing module and to output a subtraction result as an available credit value, wherein
the transfer controller includes a converter configured to convert the write data into one or more credit units and at least one of a remainder for a beginning region of the write data and a remainder for an ending region of the write data, the remainders being determined based on a logical address of the write data, and each remainder having a data size that is less than the predetermined data size of the credit unit, and wherein the reserved credit value registered by the transfer controller is a sum of one credit for each of the credit units and one credit for each of the remainders.

10. The storage device of claim 9, wherein
the current-credit storing module is configured to subtract the reserved credit value from the current credit value every time the write data corresponding to the reserved credit value is transferred to the buffer memory and to increment the current credit value by one every time write data of the credit unit is output from the buffer memory, and
the reserved-credit storing module is configured to clear the reserved credit value in response to transfer of the write data corresponding to the reserved credit value to the buffer memory.

11. The storage device of claim 10, further comprising an intermediate buffer configured to convert the data transferred from the host device into the credit unit and to transfer the write data to the buffer memory, wherein
the current-credit storing module is configured to subtract the reserved credit value from the current credit value in response to completion of the transfer of the write data corresponding to the reserved credit value by the intermediate buffer, and
the reserved-credit storing module is configured to clear the reserved credit value in response to the completion of the transfer of the write data corresponding to the reserved credit value by the intermediate buffer.

12. The storage device of claim 9, wherein the transfer controller is configured to determine a data size of the write data to be transferred by the host device and the reserved credit value corresponding to the write data size based on the available credit value output from the subtractor.

13. The storage device of claim 9, wherein
the transfer controller comprises a plurality of transfer controllers,
the reserved-credit storing module comprises a plurality of reserved-credit storing modules,
the transfer controller comprises an arbitrator configured to arbitrate a request to use the available credit value with other transfer controllers and to provide permission to use the available credit value to one of the other transfer controllers, and
the subtractor is configured to subtract a sum of reserved credit values stored by the reserved-credit storing modules from the current credit value stored by the current-credit storing module and to output a subtraction result as the available credit value.

14. A buffer management method for managing a buffer memory configured to manage a storage area according to a credit unit having a predetermined data size and to temporarily store write data requested to be written by a write command from an external device, the buffer management method comprising:
storing a number of credits currently available for the buffer memory as a current credit value in a current-credit storing module;
converting the write data into one or more credit units and at least one of a remainder for a beginning region of the write data and a remainder for an ending region of the write data, the remainders being determined based on a logical address of the write data, and each remainder having a data size that is less than the predetermined data size of the credit unit;

registering a number of credits necessary to temporarily store the write data as a reserved credit value in a reserved-credit storing module prior to transfer of the write data to the buffer memory, the reserved credit value comprising a sum of one credit for each of the credit units and one credit for each of the remainders; and subtracting the reserved credit value registered in the reserved-credit storing module from the current credit value stored by the current-credit storing module and outputting a subtraction result as an available credit value.

15. The buffer management method of claim 14, wherein the storing comprises subtracting the reserved credit value from the current credit value every time the write data corresponding to the reserved credit value is transferred to the buffer memory and to increment the current credit value by one every time write data of the credit unit is output from the buffer memory, the buffer management method further comprising clearing the reserved credit value in response to transfer of the write data corresponding to the reserved credit value to the buffer memory.

16. The buffer management method of claim 15, further comprising converting the write data transferred from the external device into the credit unit and to transfer the write data to the buffer memory, wherein the storing comprises subtracting the reserved credit value from the current credit value in response to completion of the transfer of the write data corresponding to the reserved credit value by the intermediate buffer, and the clearing comprises clearing the reserved credit value in response to the completion of the transfer of the write data corresponding to the reserved credit value by the intermediate buffer.

17. The buffer management method of claim 14, wherein the registering comprises determining a data size of the write data to be transferred by the external device and the reserved credit value corresponding to the write data size based on the available credit value output at the subtracting.

18. The buffer management method of claim 14, further comprising arbitrating a request to use the available credit value with other transfer controllers and providing permission to use the available credit value to one of the other transfer controllers, and the subtracting comprises subtracting a sum of reserved credit values from the current credit value and outputting a subtraction result as the available credit value.

* * * * *